(12) United States Patent
Grundmueller et al.

(10) Patent No.: US 9,815,144 B2
(45) Date of Patent: Nov. 14, 2017

(54) METHODS AND APPARATUSES FOR LASER PROCESSING MATERIALS

(71) Applicant: Corning Incorporated, Corning, NY (US)

(72) Inventors: Richard Grundmueller, Lengenwang (DE); Frank Fabian Herrnberger, Munich (DE); Michael Klein, Gilching (DE); Florian Spaeth, Eching (DE)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/794,181

(22) Filed: Jul. 8, 2015

(65) Prior Publication Data

US 2016/0008927 A1     Jan. 14, 2016

Related U.S. Application Data

(60) Provisional application No. 62/021,917, filed on Jul. 8, 2014.

(51) Int. Cl.
*B23K 26/70*     (2014.01)
*B23K 26/57*     (2014.01)
(Continued)

(52) U.S. Cl.
CPC ........ *B23K 26/706* (2015.10); *B23K 26/0006* (2013.01); *B23K 26/57* (2015.10);
(Continued)

(58) Field of Classification Search
CPC .. B23K 26/57; B23K 26/706; B23K 26/0006; C03B 33/102; C03B 33/082; C03B 33/091
See application file for complete search history.

(56) References Cited

U.S. PATENT DOCUMENTS 1,790,397 A     1/1931    Woods et al.
2,682,134 A     6/1954    Stookey
(Continued)

FOREIGN PATENT DOCUMENTS

CN     2388062 Y     7/2000
CN     1283409 C     11/2006
(Continued)

OTHER PUBLICATIONS

"EagleEtch—The Anti-glare Glass for Technical Display Applications", EuropTec USA Inc., www.EuropTecUSA.com, 8 pages.
(Continued)

*Primary Examiner* — Queenie Dehghan
(74) *Attorney, Agent, or Firm* — Svetlana Z. Short (57) ABSTRACT

Methods of laser processing a transparent material are disclosed. The method may include positioning the transparent material on a carrier and transmitting a laser beam through the transparent material, where the laser beam may be incident on a side of the transparent material opposite the carrier. The transparent material may be substantially transparent to the laser beam and the carrier may include a support base and a laser disruption element. The laser disruption element may disrupt the laser beam transmitted through the transparent material such that the laser beam may not have sufficient intensity below the laser disruption element to damage the support base.

21 Claims, 1 Drawing Sheet

(51) Int. Cl.
*B23K 26/00* (2014.01)
*C03B 33/08* (2006.01)
*C03B 33/10* (2006.01)
*C03B 33/02* (2006.01)
*C03B 33/09* (2006.01)
*B23K 103/00* (2006.01)

(52) U.S. Cl.
CPC ........ *C03B 33/0222* (2013.01); *C03B 33/082* (2013.01); *C03B 33/091* (2013.01); *C03B 33/102* (2013.01); *B23K 2203/54* (2015.10); *B23K 2203/56* (2015.10)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,038,055 A | 3/2000 | Hansch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo et al. |
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0289410 A1 | 12/2006 | Morita et al. |
| 2007/0021548 A1 | 1/2007 | Hattori et al. |
| 2007/0111390 A1 | 5/2007 | Komura et al. |
| 2007/0111480 A1 | 5/2007 | Maruyama et al. |
| 2007/0119831 A1 | 5/2007 | Kandt |

(56) References Cited

U.S. PATENT DOCUMENTS

| | | |
|---|---|---|
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1* | 3/2012 | Roell ................. C03B 33/033 225/2 |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1* | 10/2013 | Kondo ................. B23K 26/0066 219/121.79 |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1* | 6/2015 | Hosseini ................. B23K 26/009 428/600 |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1* | 10/2015 | Bhuyan ................. B23K 26/0057 65/29.18 |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0280580 A1 | 9/2016 | Bohme |
| 2016/0290791 A1 | 10/2016 | Buono et al. |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |

(56) References Cited

FOREIGN PATENT DOCUMENTS

| | | |
|---|---|---|
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 288503 A | 10/2005 |
| JP | 2005288503 A | 10/2005 |
| JP | 3775250 B2 | 5/2006 |
| JP | 3775410 B2 | 5/2006 |
| JP | 2006130691 | 5/2006 |
| JP | 2006248885 A | 9/2006 |
| JP | 021548 A | 2/2007 |
| JP | 2007021548 A | 2/2007 |
| JP | 2007196277 A | 8/2007 |
| JP | 2007253203 A | 10/2007 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201226345 | 7/2012 |
| WO | 9929243 A1 | 7/1999 |
| WO | 9963900 A1 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016010954 A2 | 1/2016 |

OTHER PUBLICATIONS

Abramov et al., "Laser separation of chemically strengthened glass"; Physics Procedia 5 (2010) 285-290, Elsevier.; doi: 10.1016/j.phpro.2010.08.054.

Arimoto et al., "Imaging properties of axicon in a scanning optical system"; Applied Optics, Nov. 1, 1992, vol. 31, No. 31, pp. 6653-6657.

"TruMicro 5000" Product Manual, Trumpf Laser GmbH + Co. KG, pp. 1-4, Aug. 2011.

Bhuyan et al., "High aspect ratio nanochannel machining using single shot femtosecond Bessel beams"; Applied Physics Letters 97, 081102 (2010); doi: 10.1063/1.3479419.

Bhuyan et al., "High aspect ratio taper-free microchannel fabrication using femtosecond Bessel beams"; Optics Express (2010) vol. 18, No. 2, pp. 566-574.

Cubeddu et al., "A compact time-resolved reflectance system for dual-wavelength multichannel assessment of tissue absorption and scattering"; Part of the SPIE Conference on Optical Tomography (56) References Cited

OTHER PUBLICATIONS and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"PHAROS High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper, Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning EAGLE AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator, Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Cutting Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.

(56) References Cited

OTHER PUBLICATIONS

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser, Applied Physics A Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser, JLMN-Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 396711-1-896711-8; vol. 8967; SPIE.

Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

* cited by examiner

FIG. 1

METHODS AND APPARATUSES FOR LASER PROCESSING MATERIALS

RELATED APPLICATIONS

This application claims the benefit of U.S. Provisional Application No. 62/021,917, filed on Jul. 8, 2014 The entire teachings of the above applications are incorporated herein by reference.

TECHNICAL FIELD

The present specification relates generally to the manufacture of materials and, more specifically, to laser processing of materials.

BACKGROUND

In recent years, customer demand to reduce the size, weight, and material cost of devices has led to considerable technological growth in flat panel displays for touch screens, tablets, smartphones, and TVs. Industrial lasers are becoming important tools for applications requiring high precision cutting of these materials. However, laser processing can be difficult because the high intensity laser may damage the components utilized in laser processing of the materials.

Accordingly, a need exists for alternative methods and apparatuses for laser processing materials.

SUMMARY

The embodiments described herein relate to methods and apparatuses for laser processing materials. According to one embodiment, transparent material may be laser processed. The method may comprise positioning the transparent material on a carrier and transmitting a laser beam through the transparent material, where the laser beam may be incident on a side of the transparent material opposite the carrier. The transparent material may be substantially transparent to the laser beam and the carrier may comprise a support base and a laser disruption element. The laser disruption element may disrupt the laser beam transmitted through the transparent material such that the laser beam may not have sufficient intensity below the laser disruption element to damage the support base.

In another embodiment, a multilayer stack for laser processing may comprise a carrier comprising a support base and a laser disruption element, and a transparent material positioned on the carrier. The laser disruption element may be positioned on top of the support base. The transparent material may comprise a substantially flat top surface and a substantially flat bottom surface, wherein the transparent material may be substantially transparent to a laser beam incident on a surface of the transparent material opposite the carrier. The laser disruption element may optically disrupt the laser beam transmitted through the transparent material such that the laser beam may not have sufficient intensity below the laser disruption element to damage the support base.

In yet another embodiment, a carrier may be protected when a transparent material positioned on the carrier is laser processed. The method may comprise positioning the transparent material on top of the carrier, transmitting a laser beam through the transparent material, and positioning a laser disruption element between the support base and the transparent material. The carrier may comprise a support base. The laser beam may be incident on a surface of the transparent material opposite the carrier and the laser beam may comprise a focal area having an intensity sufficient to damage the carrier. The laser disruption element may optically disrupt the laser beam transmitted through the transparent material such that the laser beam may not have sufficient intensity at any point below the laser disruption element to damage the support base.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
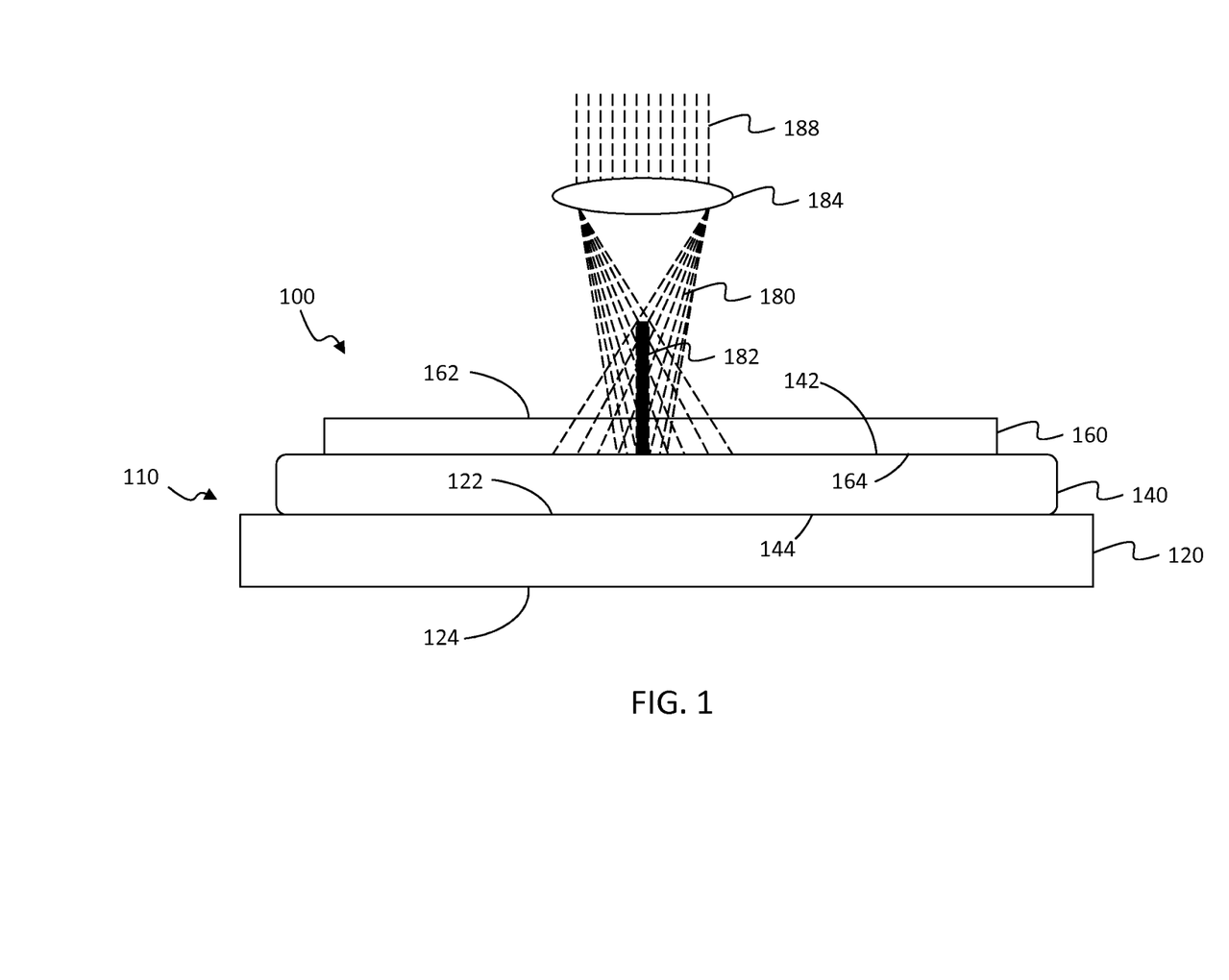
FIG. 1 schematically depicts a cross-sectional diagram of a multilayered stack undergoing laser processing, according to one or more embodiments shown and described herein.

Reference will now be made in detail to embodiments of apparatuses and methods for laser processing materials, examples of which are illustrated in the accompanying drawings. Whenever possible, the same reference numerals will be used throughout the drawings to refer to the same or like parts. One embodiment of a multilayered stack for laser processing is schematically depicted in FIG. 1. Generally, the laser processing may perforate a material that is transparent to the laser, sometimes referred to herein as the "transparent material," and the perforation may cause or contribute to cutting the transparent material at the perforation. The multilayered stack generally includes a transparent material which can be perforated or otherwise mechanically deformed by a laser beam incident on the top surface of the transparent material. The transparent material is positioned on a carrier, where at least a portion of the carrier is non-transparent to the laser beam. The carrier generally includes a support base and a laser disruption element positioned between the support base and the transparent material. The support base supports the transparent material and may be utilized to transport the transparent material to be laser processed. In one embodiment, the support base material may be non-transparent to the laser beam and may be damaged if contacted by a portion of a laser beam having an intensity great enough to damage the carrier, such as a focused area of a laser beam. However, the laser disruption element positioned between the transparent material and the support base may disrupt and diffuse a laser beam exiting the transparent material before it can contact the support base, such that upon optical disruption of the laser beam by the laser disruption element, the laser beam does not have sufficient intensity below the laser disruption element to damage the support base. As such, the laser disruption element may act as a shield to protect the support base from damage associated with contact with a portion of a laser beam with sufficient intensity to damage the support base. Various embodiments of methods and apparatuses for use in laser processing transparent materials will be described herein with specific references to the appended claims.

Referring to FIG. 1, a multilayer stack 100 is schematically depicted. Generally, the multilayer stack 100 comprises a transparent material 160 and a carrier 110 which comprises a laser disruption element 140 and a support base 120. In embodiments described herein, the transparent material 160 is positioned on top of the laser disruption element 140, which is positioned on top of the support base 120. As used herein, reference to a position above or on top of another position assumes that the top or uppermost position is the surface of the multilayer stack 100 upon which the laser beam 180 is first incident. For example, in FIG. 1, the surface of the transparent material 160 that is closest to the source laser 188 is the top surface 162 and placement of the laser disruption element 140 below the transparent material 160 means that the laser beam 180 traverses the transparent material 160 before interacting with the laser disruption element 140. As shown in FIG. 1, the source laser 188 in transmitted through an optical element 184 which forms a focused area of the laser beam 180, such as a focal line 182, which is incident upon the transparent material 160.

The transparent material 160 may be laser processed with a laser beam 180 which may alone, or with other manufacturing steps, be utilized to cut the transparent material 160. As used herein, laser processing refers to cutting, perforating, ablating, or otherwise altering the mechanical integrity of a material with a laser beam 180. Generally, the laser beam 180 must have a certain intensity at a particular area of the transparent material 160 to alter the mechanical integrity of the transparent material 160. As such, a defocused or disrupted laser beam may not have sufficient intensity to mechanically affect a material at a selected area while a focused laser beam may have sufficient intensity to cut, perforate, or ablate an area of a laser processed material. However, a focused area of a laser beam, such as a laser beam with a focused focal line 182, may have sufficient intensity to perforate the transparent material 160 as well as to damage a support base 120 directly contacted by the focal line 182. A focal line 182 of a laser beam 180 may be produced by an optical assembly 184 which can optically alter the path of a source laser 188. Also, as used herein, in the context of laser beams, "intensity" may be referred to as "energy density" and the two terms are interchangeable. The laser beam 180 has a wavelength, and as used herein, a material that is "transparent" is substantially transparent to electromagnetic radiation of the wavelength of the laser such that the absorption by the transparent material 160 is less than about 10%, less than about 5%, or even less than about 1% per mm of material depth at the wavelength of the laser. "Electromagnetic radiation" may be referred to herein as "light" and the two terms are interchangeable and may correspond with electromagnetic radiation both inside and outside of the visible spectrum.

The support base 120 is generally any structure capable of supporting the transparent material 160 which will be laser processed by the laser beam 180. The support base 120 may act as a carrying tray for the transparent material 160 and may have a substantially flat top surface 122, for interaction with a flat transparent material 160, and a substantially flat bottom surface 124, for interaction with a substantially flat work table upon which the support base 120 may be positioned. The support base 120 may be positioned on a table or other workspace for stability during laser processing. In one embodiment, the support base 120 may comprise aluminum. For example, the support base 120 may comprise greater than about 50%, greater than about 70%, greater than about 90%, greater than about 95%, or even greater than about 99% aluminum. In one embodiment, the support base 120 may comprise a honeycomb aluminum structure, such as ALUCORE®, commercially available from 3A Composites International AG. In another embodiment, the support base 120 may comprise polyoxymethylene. If non-transparent materials, such as the materials of the support base 120, are contacted by the focal line 182, the support base 120 can be damaged, which may result in contamination of the laser processed transparent material 160. As used herein, damage to the support base 120 includes, without limitation scratching, ablating, cutting, slashing, abrasion, scoring, or other disruption in the mechanical integrity of the top surface 122 of the support base 120.

In one embodiment, the support base 120 may be placed on a table or other work station during the laser processing. The table or workstation may have a vacuum system which creates suction upon the surface of the table or workstation. For example, the table or workstation may have vacuum holes in its surface, and the support base 120 and laser disruption element 140 may have corresponding holes through which the vacuum may create suction and secure materials positioned on top of the laser disruption element 140. For example, the transparent material 160 may be secured to the disruption element 140 by vacuum suction which permeates through holes in the disruption element 140, support base 120, and workstation. The support base 120 and the laser disruption element 140 may be mechanically fastened to one another such as with screws, fasteners, pins, or other suitable means. As such, the transparent material 160 can rest upon the laser disruption element 140 and be secured by the vacuum system while laser processed.

The transparent material 160 may be any material substantially transparent to the electromagnetic radiation of the laser beam 180. For example, the transparent material 160 may be, without limitation, glass, sapphire, silicon, silicon-carbide, quartz, alumina ($Ab0_3$), aluminum nitride (AlN), Zirconia ($ZrO_2$), gallium-Nitride, gallium-arsenide (GaAs), gallium-phosphide (GaP), gallium-antimonide (GaSh), indium-arsenide (InAs), indium-phosphide (InP), indium-antimonide (InSb), cadmium-sulphide (CdS), cadmium-selenide (CdSe), cadmium-telluride (CdTe), zinc-sulfide (ZnS), zink-selenide (ZnSe), zink-telluride (ZnTe), germanium (Ge), lithium-niobate ($LiNbO_3$), lithium-tantalate ($LiTaO_3$), or combinations thereof. The transparent material 160 may have a substantially flat top surface 162 and a substantially flat bottom surface 164, such as would be suitable for cover glass for an electronic device. The top surface 162 and/or the bottom surface 164 may be polished. In another embodiment, the transparent material 160 may be a wafer material for semiconductor manufacturing. If glass is utilized as the transparent material 160, the glass may generally be any glass suitable for formation as a sheet. In some embodiments, the glass may be ion-exchangeable aluminosilicate glass. Examples of such ion-exchangeable aluminosilicate glass include, but are not limited to, Gorilla Glass® and Gorilla Glass II® (commercially available from Corning, Inc.). Such glass, especially after laser processing, may be well suited for many uses, such as, for example, as cover glass for hand-held consumer electronic devices.

The laser beam 180 may be operable to create small (micron and smaller) "holes" in the transparent material 160 for the purpose of drilling, cutting, separating, perforating, or otherwise processing the transparent material 160 at the focal line 182. More particularly, an ultrashort (i.e., from $10^{-10}$ to $10^{-15}$ second) pulse laser beam 180 having wavelengths such as 1064 nm, 532 nm, 355 nm, or 266 nm is focused, as the focal line 182, to an energy density above the threshold needed to create a defect in the region of focus at the surface of or within the transparent material 160. The laser beam 180 may have a repetition rate in a range of between about 1 kHz and 2 MHz, or in another embodiment, between about 10 kHz and about 650 kHz. By repeating the process, a series of laser-induced defects aligned along a predetermined path can be created in the transparent material 160. By spacing the laser-induced features sufficiently close together, a controlled region of mechanical weakness within the transparent material 160 can be created and the transparent material 160 can be precisely fractured or separated (mechanically or thermally) along the path defined by the series of laser-induced defects (shown in FIG. 1 as the area of the transparent material 160 proximate the focal line 182). The ultrashort laser pulse(s) may be optionally followed by a carbon dioxide ($CO_2$) laser or other source of thermal stress to effect fully automated separation of the transparent material 160. Representative laser beam 180 characteristics, which can be applied to laser process a transparent substrate, are described in detail in U.S. Patent Application 61/917,092 TITLED "METHOD AND DEVICE FOR THE LASER-BASED MACHINING OF SHEET-LIKE SUBSTRATES, the teachings of which are incorporated herein by reference in their entirety.

The wavelength of the laser beam 180 may be selected so that the material to be laser processed (drilled, cut, ablated, damaged or otherwise appreciably modified by the laser) is transparent to the wavelength of the laser. The selection of the laser source may also depend on the ability to induce multi-photon absorption (MPA) in the transparent material 160. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two photons. MPA is a third-order nonlinear process that is several orders of magnitude weaker than linear absorption. It differs from linear absorption in that the strength of absorption depends on the square of the light intensity, thus making it a nonlinear optical process. At ordinary light intensities, MPA is negligible. If the light intensity (energy density) is extremely high, such as in the region of the focal line 182 of a laser beam 180 (particularly a pulsed laser source), MPA becomes appreciable and leads to measurable effects in the material within the region where the energy density of the laser beam 180 is sufficiently high (i.e. the focal line 182). Within the region of the focal line 182, the energy density may be sufficiently high to result in ionization.

At the atomic level, the ionization of individual atoms has discrete energy requirements. Several elements commonly used in glass (e.g., Si, Na, K) have relatively low ionization energies, such as about 5 eV. Without the phenomenon of MPA, a laser wavelength of about 248 nm would be required to create linear ionization at about 5 eV. With MPA, ionization or excitation between states separated in energy by about 5 eV can be accomplished with wavelengths longer than 248 nrn. For example, photons with a wavelength of 532 nrn have an energy of about 2.33 eV, so two photons with wavelengths of 532 nrn can induce a transition between states separated in energy by about 4.66 eV in two-photon absorption (TPA).

Thus, atoms and bonds may be selectively excited or ionized in the regions of the transparent material 160 where the energy density of the laser beam 180 is sufficiently high to induce nonlinear TPA of a laser wavelength having half the required excitation energy. MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line or "perforation") that mechanically weakens the transparent material 160 and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the transparent material 160. In one embodiment, laser processing includes separation of a part from the transparent material 160 processed by the laser beam 180, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

According to some embodiments perforations can be accomplished with the use of an ultra-short pulse laser in combination with optics that generates a focal line to fully perforate the body of a range of glass compositions. In some embodiments, the pulses are single pulses (i.e., the laser provides equally separated single pulses rather than pulse bursts (closely spaced single pulses that are grouped together), with the pulse duration of the individual pulses is in a range of between greater than about 1 picoseconds and less than about 100 picoseconds, such as greater than about 5 picoseconds and less than about 20 picoseconds, and the repetition rate of the individual pulses can be in a range of between about 1 kHz and 4 MHz, such as in a range of between about 10 kHz and 650 kHz. Perforations can also be accomplished with a single "burst" of high energy short duration pulses spaced close together in time. Such pulses can be produced in bursts of two pulses, or more (such as, for example, 3 pulses, 4, pulses, 5 pulses, 10 pulses, 15 pulses, 20 pulses, or more) separated by a duration between the individual pulses within the burst that is in a range of between about 1 nsec and about 50 nsec, for example, 10 to 30 nsec, such as about 20 nsec, and the burst repetition frequency can be in a range of between about 1 kHz and about 200 kHz. (Bursting or producing pulse bursts is a type of laser operation where the emission of pulses is not in a uniform and steady stream but rather in tight clusters of pulses.) The pulse burst laser beam can have a wavelength selected such that the material is substantially transparent at this wavelength. The laser pulse duration may be $10^{-10}$ s or less, or $10^{-11}$ s or less, or $10^{-12}$ s or less, or $10^{-13}$ s or less. For example, the laser pulse duration may be between about 1 picosecond and about 100 picoseconds, or in another embodiment, between about 5 picoseconds and about 20 picoseconds. These "bursts" may be repeated at high repetition rates (e.g. kHz or MHz). The average laser power per burst measured (if burst pulses are utilized) at the material can be greater than 40 microJoules per mm thickness of material, for example between 40 microJoules/mm and 2500 microJoules/mm, or between 500 and 2250 microJoules/mm. For example, for one embodiment when using f 0.1 mm-0.2 mm thick glass one may use 200 µJ pulse bursts to cut and separate the glass, which gives an exemplary range of 1000-2000 µJ/mm. For example, for an examplary 0.5-0.7 mm thick glass, one may use 400-700 µJ pulse bursts to cut and separate the glass, which corresponds to an exemplary range of 570 µJ/mm (400 µJ/0.7 mm) to 1400 µJ/mm (700 µJ/0.5 mm). The perforations may be spaced apart and precisely positioned by controlling the velocity of a substrate or stack relative to the laser through con trol of the motion of the laser and/or the substrate or stack. In one embodiment, in a single pass, a laser can be used to create highly controlled full line perforation through the material, with extremely little (less than about 75 m, or even less than about 50 m) subsurface damage and debris generation. This is in contrast to the typical use of spot-focused laser to ablate material, where multiple passes are often necessary to completely perforate the glass thickness, large amounts of debris are formed from the ablation process, and more extensive sub-surface damage (less than about 100 m) and edge chipping occur. These perforations, defect regions, damage tracks, or defect lines are generally spaced from 1 to 25 microns apart (for example, 3-12 microns, or 5-20 microns). According to some embodiments the pulsed laser has laser power of 10 W-150 W and produces pulse bursts with at least 2 pulses per pulse burst. According to some embodiments the pulsed laser has laser power of 10 W-100 W and produces pulse bursts with at least 2-25 pulses per pulse burst. According to some embodiments the pulsed laser has laser power of 25 W-60 W, and produces pulse bursts with at least 2-25 pulses per burst and the periodicity between the defect lines is 2-20 microns, or 2 to 15 microns, or 2-10 microns.

The pulse burst laser beam can have a wavelength selected such that the material is substantially transparent at this wavelength. According to some embodiments the pulsed has a pulse duration of less than 10 picoseconds. According to some embodiments the pulsed laser has a pulse repetition frequency of between 10 kHz and 1000 kHz.

Thus, it is possible to create a microscopic (i.e., less than about 1 µm, less than 0.5 nm (for example ≤400 nm, or ≤300 nm) or even less than about 100 nm in diameter (e.g, 50 nm-100 nm)) elongated "hole" (also called a perforation or a defect line) in a transparent material 160 using a single high energy burst pulse. These individual perforations can be created at rates of several hundred kilohertz (several hundred thousand perforations per second, for example). Thus, with relative motion between the source and the material these perforations can be placed adjacent to one another (spatial separation varying from sub-micron to several microns as desired). This spatial separation is selected in order to facilitate cutting. In some embodiments the defect line is a "through hole", which is a hole or an open channel that extends from the top to the bottom of the transparent material 160. Furthermore, the internal diameter of a defect line can be as large as the spot diameter of the laser beam focal line, for example. The laser beam focal line can have an average spot diameter in a range of between about 0.1 micron and about 5 microns, for example 1.5 to 3.5 microns.

To form a focal line 182, a source laser 188 may be transmitted through an optical assembly 184. Suitable optical assemblies, which can optical assemblies can be applied, are described in detail in U.S. Patent Application No. 61/917,092 • TITLED "STACKED TRANSPARENT MATERIAL CUTTING WITH ULTRAFAST LASER BEAM OPTICS, DISRUPTIVE LAYERS AND OTHER LAYERS, the teachings of which are incorporated herein by reference in their entirety. For example, an optical assembly 184 positioned in the beam path of the source laser 188 is configured to transform the source laser 188 into a focal line 182, viewed along the beam propagation direction, the laser beam focal line 182 having a length in a range of between 0.1 mm and 100 mm, for example, 0.1 to 10 nm. The laser beam focal line can have a length in a range of between about 0.1 mm and about 10 mm, or between about 0.5 mm and about 5 mm, such as about 1 mm, about 2 mm, about 3 mm, about 4 mm, about 5 mm, about 6 mm, about 7 mm, about 8 mm, or about 9 mm, or a length in a range of between about 0.1 mm and about 1 mm, and an average spot diameter in a range of between about 0.1 micron and about 5 microns. The holes or defect lines each can have a diameter between 0.1 microns and 10 microns, for example 0.25 to 5 microns (e.g., 0.2-0.75 microns). For example, as shown in FIG. 1, a spherical or disc shaped optical assembly 184 may be utilized to focus the source laser 188 and form a focal line 182 of a defined length.

Note that typical operation of such a picosecond laser described herein creates a "burst" 500 of pulses 500A. Each "burst" (also referred to herein as a "pulse burst" 500) contains multiple individual pulses 500A (such as at least 2 pulses, at least 3 pulses, at least 4 pulses, at least 5 pulses, at least 10 pulses, at least 15 pulses, at least 20 pulses, or more) of very short duration. That is, a pulse burst is a "pocket" of pulses, and the bursts are separated from one another by a longer duration than the separation of individual adjacent pulses within each burst. Pulses 500A have pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). The energy or intensity of each individual pulse 500A within the burst may not be equal to that of other pulses within the burst, and the intensity distribution of the multiple pulses within a burst 500 often follows an exponential decay in time governed by the laser design. Preferably, each pulse 500A within the burst 500 of the exemplary embodiments described herein is separated in time from the subsequent pulse in the burst by a duration $T_p$ from 1 nsec to 50 nsec (e.g. 10-50 nsec, or 10-30 nsec, with the time often governed by the laser cavity design). For a given laser, the time separation $T_p$ between adjacent pulses (pulse-to-pulse separation) within a burst 500 is relatively uniform (±10%). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or about ±2 nsec. The time between each "burst" of pulses (i.e., time separation $T_b$ between bursts) will be much longer (e.g., 0.25≤$T_b$≤1000 microseconds, for example 1-10 microseconds, or 3-8 microseconds). In some of the exemplary embodiments of the laser described herein the time separation $T_b$ is around 5 microseconds for a laser with burst repetition rate or frequency of about 200 kHz. The laser burst repetition rate is relates to the time $T_b$ between the first pulse in a burst to the first pulse in the subsequent burst (laser burst repetition rate=1/$T_b$). In some embodiments, the laser burst repetition frequency may be in a range of between about 1 kHz and about 4 MHz. More preferably, the laser burst repetition rates can be, for example, in a range of between about 10 kHz and 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 k Hz burst repetition rate). The exact timings, pulse durations, and burst repetition rates can vary depending on the laser design, but short pulses ($T_d$<20 psec and preferably $T_d$≤15 psec) of high intensity have been shown to work particularly well.

The energy required to modify or perforate the material (e.g., glass) can be described in terms of the burst energy—the energy contained within a burst (each burst 500 contains a series of pulses 500A), or in terms of the energy contained within a single laser pulse (many of which may comprise a burst). For these applications, the energy per burst can be from 25-750 µJ, more preferably 50-500 µJ, or 50-250 µJ. In some embodiments the energy per burst is 100-250 µJ. The energy of an individual pulse within the pulse burst will be less, and the exact individual laser pulse energy will depend on the number of pulses 500A within the pulse burst 500 and the rate of decay (e.g., exponential decay rate) of the laser. For example, for a constant energy/burst, if a pulse burst contains 10 individual laser pulses 500A, then each individual laser pulse 500A will contain less energy than if the same pulse burst 500 had only 2 individual laser pulses.

Laser "ablative" cutting of thin glasses, as described in some embodiments herein, has advantages that include no minimization or prevention of crack creation at or near the region of ablation and the ability to perform free form cuts of arbitrary shape. It is beneficial to avoid edge cracking and residual edge stress in glass substrates for flat panel displays because flat panel displays have a pronounced propensity to break from an edge, even when stress is applied to the center. The high peak power of ultrafast lasers combined with tailored beam delivery in the method described herein can avoid these problems because the present method is a "cold" ablation technique that cuts without a deleterious heat effect. Laser cutting by ultrafast lasers according to the present method produces essentially no residual stress in the glass. However, it should be understood that any type of laser may be utilized in the laser processing methods and apparatus described herein.

Still referring to FIG. 1, positioned on top of the support base 120 and between the support base 120 and the transparent material 160 is the laser disruption element 140. In one embodiment, the laser disruption element 140 may be a substantially flat sheet with a substantially flat top surface 142 and bottom surface 144 which correspond with the flat surface of the top surface 122 of the support base 120 and the bottom surface 164 of the transparent material 160, respectively. Generally, the laser disruption element 140 optically disrupts a laser beam 180 transmitted through the transparent material 160 such that the laser beam 180 does not have sufficient intensity (i.e., at the focal line 182) below the laser disruption element 140 to damage the support base 120. For example, optical disruption may include reflection, absorption, scattering, defocusing or otherwise interfering with the laser beam 180. The disruption element 140 may reflect, absorb, scatter, defocus or otherwise interfere with an incident laser beam 180 to inhibit or prevent the laser beam 180 from damaging or otherwise modifying underlying layers in the multilayer stack 100, such as the support base 120.

In one embodiment, the laser disruption element 140 is positioned immediately below the transparent material 160 which is laser processed. Such a configuration is shown in FIG. 1, where the beam disruption element 140 is a substantially flat sheet positioned immediately below the transparent material 160 in which the laser processing described herein will occur. In some embodiments, the laser disruption element 140 may be positioned in direct contact with the support base 120, but in other embodiments another layer of material may be disposed between the support base 120 and the laser disruption element 140. In one embodiment, the laser disruption element 140 may have a thickness as measured from its top surface 142 to its bottom surface 144 from about 0.5 mm to about 3 mm. The edges of the laser disruption element 140 may have a rounded shape with beveled corners, substantially free of sharp corners.

The laser disruption element 140 has different optical properties than the transparent material 160 to be cut by laser processing. For example, the beam disruption element 140 may comprise a defocusing element, a scattering element, a translucent element, or a reflective element. A defocusing element is an interface or a layer comprising a material that prevents the laser beam light 180 from forming the laser beam focal line 182 on or below the defocusing element. The defocusing element may comprise a material or interface with refractive index in homogeneities that scatter or perturb the wavefront of the laser beam 180. In embodiments where the laser disruption element is a translucent element, the translucent element is an interface or layer of material that allows light to pass through, but only after scattering or attenuating the laser beam 180 to lower the energy density sufficiently to prevent formation of a laser beam focal line 182 in portions of the multilayer stack 100 on the side of the translucent element that are opposite from the laser beam 180.

As shown in FIG. 1, a laser beam 180 may pass into and through the transparent material 160 and contact the top surface 142 of the laser disruption element 140. The laser disruption element 140 may disrupt the laser beam 180 such that the intensity of the laser beam 180 is reduced before it reaches the support base 120. More specifically, the reflectivity, absorptivity, defocusing, attenuation, and/or scattering of the disruption element 140 can be utilized to create a barrier or impediment to the laser radiation. It is not necessary that the absorption, reflection scattering, attenuation, defocusing etc. of the laser beam 180 by the disruption element 140 be complete. The effect of the disruption element 140 on the laser beam 180 may be sufficient to reduce the energy density or intensity of the focal line 182 to a level below the threshold required for cutting, ablation, perforating etc. of the support base 120. In one embodiment, the disruption element 140 reduces the energy density or intensity of the focal line 182 to a level below the threshold needed to damage the support base 120. The laser disruption element 140 may be a layer or an interface and may be configured to absorb, reflect, or scatter the laser beam 180, where the absorption, reflection, or scattering are sufficient to reduce the energy density or intensity of the laser beam 180 transmitted to the support base 120 (or other underlying layer) to a level below that required to cause damage to the support base 120 or other underlying layers.

In one embodiment, the laser disruption element 140 may optically disrupt the laser beam 180 at the top surface 142 of the laser disruption element 140. For example, in one embodiment, the laser disruption element 140 may comprise a film on its top layer 142 or a surface modified top surface 142. For example, the disruption element 140 may comprise a roughened top surface 142 (surface nearest the transparent material 160) which is modified to be substantially rough to scatter incident light. Additionally, if the top surface 142 of the laser disruption element 140 acts to interfere with the laser beam 180, the bulk material of the laser disruption layer may be substantially the same material as the transparent substrate since no focal line 182 is formed below the top surface 142 of the laser disruption element 140. For example, in one embodiment, the transparent material 160 may be glass and the disruption element 140 may be glass. Furthermore, a laser disruption element 140 that has a bulk material transparent to the laser wavelength can transmit the laser and substantially disperse the intensity throughout the bulk material structure of the disruption element 140. In such an embodiment, the laser disruption element 140 is not damaged by a laser beam 180 transmitted through the transparent material 160.

In one embodiment, the laser disruption element 140 may comprise frosted glass, such as, for example, a sheet of frosted glass. The frosted glass, sometimes referred to as iced glass, may be substantially translucent. The relatively rough top surface 142 may act as a translucent element which scatters an incident laser beam 180. The frosted glass may be chemically etched, sand blasted, or otherwise manufactured to have a translucent appearance that operates to disrupt incident light. However, in one embodiment, the frosted glass may be substantially smooth so as to not damage a transparent material 160 which is resting its top surface 142 during laser processing. For example, sand blasted frosted glass may be rough enough to damage a laser processed transparent material 160 by scratching when the transparent material 160 is placed on the laser disruption element 140. However, chemically etched glass may provide suitable optical characteristics while still being sufficiently smooth to not damage the transparent material 160. As used herein, damage to the transparent material 160 means damage that is detectable by a human eye, such as scratches, cuts, or other abrasions.

In one embodiment, the average roughness (Ra) of the top surface 142 may be greater than or equal to about 0.5 microns, greater than or equal to about 0.8 microns, greater than or equal to about 1.0 microns, greater than or equal to about 1.5 microns, or even greater than or equal to about 2.0 microns, As used herein, Ra is defined as the arithmetic average of the differences between the local surface heights and the average surface height and can be described by the following equation:

$$R_a = \frac{1}{n}\sum_{i=1}^{n}|y_i|$$

where Yi is the local surface height relative to the average surface height. In other embodiments Ra may be from about 0.5 microns to about 2.0 microns, from about 0.5 microns to about 1.5 microns, or from about 0.5 microns to about 1.0 micron. For example, in one embodiment, the frosted glass may be EagleEtch® acid etched glass commercially available from EuropTec USA of Clarksburg, W. Va.

In another embodiment, the laser disruption element 140 may comprise a surface film layer that acts to disrupt the laser beam 180 and substantially protect underlying layers such as the support base 120. The optically disrupting film layer may be deposited by thermal evaporation, physical vapor deposition, and/or sputtering, where the thickness may be a function of the wavelength of the utilized laser. The thin films may comprise, without limitation, $MgF_2$, $CaF_2$, poly (methyl methacrylate), PMMI, polycarbonates, styrene-acrylonitrile copolymers, polystyrenes, cyclic olefin polymer, cyclic olefin copolymers, and combinations thereof.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of laser processing a transparent material, the method comprising:
   positioning the transparent material on a carrier; and
   transmitting a laser beam through the transparent material, the laser beam incident on a side of the transparent material opposite the carrier, wherein
   the transparent material is substantially transparent to the laser beam;
   the carrier comprises a support base and a laser disruption element;
   the laser disruption element optically disrupts the laser beam transmitted through the transparent material such that the laser beam does not have sufficient intensity below the laser disruption element to damage the support base; and
   the laser disruption element comprises frosted glass.

2. The method of claim 1, wherein at least a portion of the carrier is non-transparent to the laser beam.

3. The method of claim 1, wherein the laser disruption element is not damaged by the laser beam transmitted through the transparent material.

4. The method of claim 1, wherein the transparent material is glass.

5. The method of claim 1, further comprising perforating the transparent material with the laser beam incident on the transparent material.

6. The method of claim 1, wherein the laser beam has a pulse duration between about 1 picosecond and about 100 picoseconds.

7. The method of claim 1, wherein the laser beam has a pulseburstrepetition rate of between about 1 kHz and 2 MHz and each pulse burst has at least two pulses.

8. The method of claim 1, wherein the laser disruption element comprises a roughened surface that optically disrupts the laser beam.

9. The method of claim 8, wherein an average roughness (Ra) of the roughened surface is greater than or equal to about 0.5 microns.

10. The method of claim 8, wherein the roughened surface is the surface of the laser disruption element nearest the transparent material.

11. The method of claim 1, wherein the laser disruption element is a substantially flat sheet.

12. The method of claim 1, wherein the laser disruption element is translucent.

13. The method of claim 1, wherein the pulsed laser has laser power of 10 W-150 W and produces pulse bursts with at least 2 pulses per pulse burst.

14. The method of claim 13, wherein the pulsed laser has laser power of 10 W-100 W and produces pulse bursts with at least 2-25 pulses per pulse burst.

15. The method of claim 13, wherein the pulsed laser has laser power of 25 W-60 W, and produces pulse bursts with at least 2-25 pulses per burst and the periodicity between the defect lines is 2-20 microns.

16. A method of protecting a carrier when laser processing a transparent material positioned on the carrier, the method comprising:
  positioning the transparent material on top of the carrier, the carrier comprising a support base;
  transmitting a laser beam through the transparent material, wherein the laser beam is incident on a surface of the transparent material opposite the carrier, the laser beam comprising a focal area having an intensity sufficient to damage the carrier; and
  positioning a laser disruption element between the support base and the transparent material, the laser disruption element optically disrupting the laser beam transmitted through the transparent material such that the laser beam does not have sufficient intensity at any point below the laser disruption element to damage the support base, wherein the laser disruption element comprises frosted glass.

17. The method of claim 16, wherein the laser disruption element comprises a roughened surface that optically disrupts the laser beam.

18. The method of claim 17, wherein an average roughness (Ra) of the roughened surface is greater than or equal to about 0.5 microns.

19. The method of claim 16, wherein the pulsed laser has laser power of 10 W-150 W and produces pulse bursts with at least 2 pulses per pulse burst.

20. The method of claim 19, wherein the pulsed laser has laser power of 10 W-100 W and produces pulse bursts with at least 2-25 pulses per pulse burst.

21. The method of claim 19, wherein the pulsed laser has laser power of 25 W-60 W, and produces pulse bursts with at least 2-25 pulses per burst and the periodicity between the defect lines is 2-20 microns.

* * * * *

UNITED STATES PATENT AND TRADEMARK OFFICE
CERTIFICATE OF CORRECTION

Page 1 of 1

PATENT NO. : 9,815,144 B2
APPLICATION NO. : 14/794181
DATED : November 14, 2017
INVENTOR(S) : Richard Grundmueller et al.

It is certified that error appears in the above-identified patent and that said Letters Patent is hereby corrected as shown below:

On the Title Page

On page 5, in Column 1, item (56), Other Publications, Line 32, delete "pluse" and insert -- pulse --, therefor.

On page 6, in Column 2, item (56), Other Publications, Line 20, delete "396711-1" and insert -- 896711-1 --, therefor.

On page 6, in Column 2, item (56), Other Publications, Line 27, delete "Eelectropolishing;" and insert -- Electropolishing; --, therefor.

In the Specification

In Column 1, Line 7, after "2014" insert -- . --.

In the Claims

In Column 12, Line 43, Claim 7, delete "pulseburstrepetition" and insert -- pulse burst repetition --, therefor.

Signed and Sealed this
Twenty-fifth Day of July, 2023

Katherine Kelly Vidal
*Director of the United States Patent and Trademark Office*